United States Patent [19]
Ward

[11] Patent Number: 5,924,209
[45] Date of Patent: Jul. 20, 1999

[54] POWERED COPING SAW

[76] Inventor: Troyse W. Ward, 141 Kawga Way, Loudeu, Tenn. 37774

[21] Appl. No.: 08/946,678

[22] Filed: Oct. 8, 1997

[51] Int. Cl.⁶ .......................... B23D 49/04; B23D 49/16; B27B 19/06; B27B 19/09
[52] U.S. Cl. .................... 30/392; 30/394; 83/785
[58] Field of Search ..................... 30/392, 393, 394, 30/507, 509, 513; 83/783, 784, 785, 786

[56] References Cited

U.S. PATENT DOCUMENTS

| | | | |
|---|---|---|---|
| 803,694 | 11/1905 | Jones | 30/509 |
| 1,467,720 | 9/1923 | Field | 83/785 |
| 1,498,135 | 6/1924 | Uden | 83/785 |
| 1,512,781 | 10/1924 | Masland | 30/392 |
| 1,626,503 | 4/1927 | Bjorklund | 30/392 |
| 2,721,586 | 10/1955 | Hill | 30/394 |
| 2,816,583 | 12/1957 | Hill | 30/392 |
| 3,260,289 | 7/1966 | Whitten, Jr. | 30/392 |
| 4,949,464 | 8/1990 | Adomatis | 30/509 |
| 5,027,518 | 7/1991 | Adomatis | 30/392 |
| 5,077,902 | 1/1992 | Hitt | 30/394 |
| 5,369,887 | 12/1994 | Keevers | 30/394 |
| 5,388,334 | 2/1995 | Halsey | 30/509 |

*Primary Examiner*—Hwei-Siu Payer
*Attorney, Agent, or Firm*—Howard & Howard

[57] ABSTRACT

The saw includes a frame having an opening with a pair of proximate and distal blade retaining chucks located on respective sides of the opening. A saw blade is retained between the pair of chucks. A plurality of pulleys are attached in spaced relation to the frame including pulleys on opposed sides of the opening. A flexible band is entrained about each of the plurality of pulleys, with the band having a first end operatively connected to the proximate blade retaining chuck and a second end attached to the distal blade retaining chuck. A reciprocating drive is attached to the proximate blade retaining chuck. The reciprocating drive and the flexible band work in conjunction to pull the blade in opposite directions during each cycle of the drive. An alternative embodiment of the present invention may take the form of a stationary table saw.

18 Claims, 4 Drawing Sheets

1

POWERED COPING SAW

BACKGROUND OF THE INVENTION

The present invention relates to coping saws and, more particularly, to power driven coping saws. A typical coping saw includes a thin, linear saw blade held under tension in a U-shaped frame having a handle extending away from and generally parallel to the saw blade. To cut a work piece, such as wood, the saw blade is manually pushed and pulled in reciprocating directions. Occasionally, the blade of the coping saw is bent or broken when the blade is unable to cut through the work piece and is jammed or caught. The blade of the coping saw is especially susceptible to bending or breaking when pushed through the work piece. In commercial settings, manual cutting with a coping saw is highly labor intensive, time consuming, and prone to produce repetition-induced injury. Thus, there is a need for a hand-held powered coping saw. To overcome the shortcomings of manual coping saws, the blade of the powered coping saw must be held taut and pulled, not pushed, with equal force in each direction through a work piece to prevent the blade from jamming, bending, or breaking.

Powered coping saws disclosed in prior patents have attempted to perfect a design which pulls the blade with equal force in opposite directions through the work piece; however, for various reasons these saws have not proven practical. For example, U.S. Pat. No. 4,949,464 issued on Aug. 21, 1990 to Adomatis discloses a battery operated coping saw including motor means attached to one end of a saw blade and spring means attached to the opposite end of the saw blade. To reciprocate the saw blade, the motor means pulls the blade in a first direction toward the motor and, thereafter, the spring means pulls the blade in a second direction away from the motor. As claimed, the spring means must operate to pull the blade in the second direction away from the motor but yield to allow the motor means to pull the blade in the first direction toward the motor. As a result, the motor means and the spring means can not pull the blade with equal force through the work piece thereby making the blade susceptible to jamming or breaking when the blade is pulled by the spring means in the second direction away from the motor.

U.S. Pat. No. 5,369,887 issued on Dec. 6, 1994 to Keevers also discloses a powered coping saw. The saw includes a motor means which drives a reciprocating linkage attached to opposite ends of a saw blade. The reciprocating linkage is comprised of three arms and pivots to pull the saw blade in opposite directions. Although the reciprocating linkage pulls the blade with equal force in opposite directions, the design has several shortcomings. Foremost, the arms are heavy and linked in a complicated and expensive arrangement. Accordingly, there is a need for a powered coping saw which overcomes these shortcomings in the prior art.

SUMMARY OF THE INVENTION

The present invention provides an improved hand-held, power driven coping saw. The saw includes a frame having an opening with a pair of proximate and distal blade retaining chucks located on respective sides of the opening. A saw blade is retained between the pair of chucks. A plurality of pulleys are attached in spaced relation to the frame including pulleys on opposed sides of the opening. A flexible band is entrained about each of the plurality of pulleys, with the band having a first end operatively connected to the proximate blade retaining chuck and a second end attached to the distal blade retaining chuck. A reciprocating drive is attached to the proximate blade retaining chuck. During each cycle of the reciprocating drive, the blade is first pulled in one direction by the reciprocating drive and then pulled in the opposite direction by the second end of the flexible band.

Unlike manual coping saws, the hand-held powered coping saw of this invention pulls the blade in reciprocal directions through a work piece. The present invention is faster, cheaper, and more efficient than a manual coping saw. Further, the present invention is lighter, more reliable, and less expensive than prior art powered coping saws.

An alternative embodiment of the present invention may take the form a stationary table saw.

Other advantages and meritorious features of the present invention will be more fully understood from the description of the preferred embodiments, the appended claims and the drawings, a brief description of which follows.

BRIEF DESCRIPTION OF THE DRAWINGS

FIG. 3 is an enlarged, fragmentary top view of a distal blade retaining chuck;

FIG. 4 is an enlarged, fragmentary side view of the distal blade retaining chuck of FIG. 3.

FIG. 5 is an enlarged end view of the distal blade retaining chuck of FIG. 3.

DETAILED DESCRIPTION OF THE PREFERRED EMBODIMENT

Figure 1:
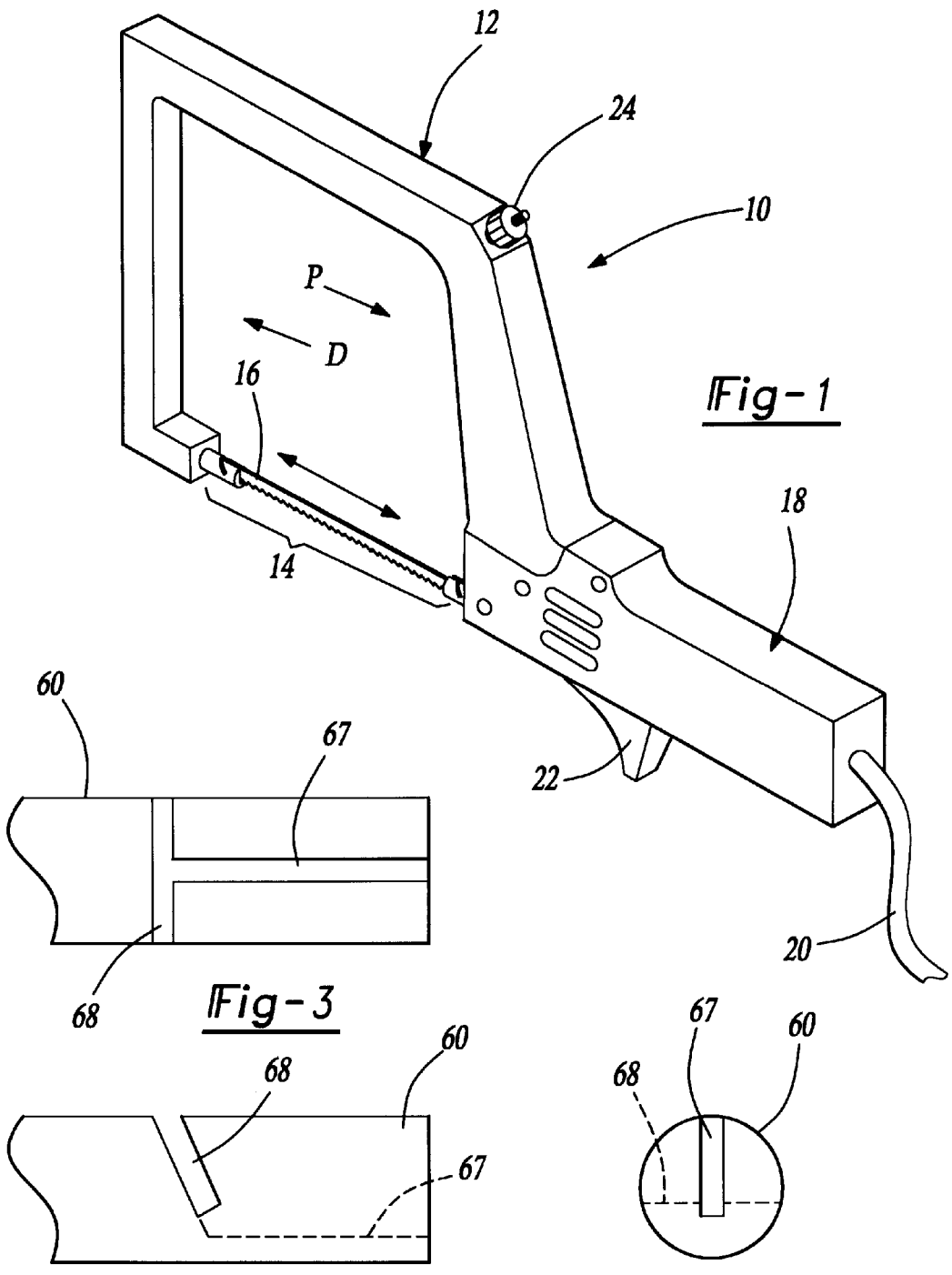
FIG. 1 is a perspective view of a hand-held powered coping saw according to the present invention having a U-shaped frame, a handle, and a saw blade.

FIG. 1 shows an improved hand-held powered coping saw 10 of the present invention having a U-shaped frame 12 defining a mouth or opening 14, a saw blade 16 positioned within opening 14, and a handle 18 attached to frame 12. Handle 18 extends from U-shaped frame 12 away from opening 14 generally parallel to saw blade 16. Handle 18 includes an electrical cord 20 to supply power to saw 10 and a power switch 22 to switch power to saw 10 on and off. While coping saw 10 is shown as a plug-in tool, one of ordinary skill in the art will recognize that the saw 10 may also be designed as a battery operated, cordless tool with the battery stored within handle 18. Saw 10 further includes a thumb screw 24 used to tauten and loosen saw blade 16. U-shaped frame 12 and handle 18 are generally made from a rigid, durable material such as plastic or metal and must be strong enough to withstand the normal stresses imposed on a coping saw during use.

For ease of explanation directions will be given in terms of "proximal" and "distal". The proximal direction is the direction toward handle 18 as indicated by arrow P. The distal direction is the direction away from handle 18 as indicated by arrow D. When saw 10 is switched on, blade 16 is moved in alternating proximal and distal directions within opening 14.

Figure 2:
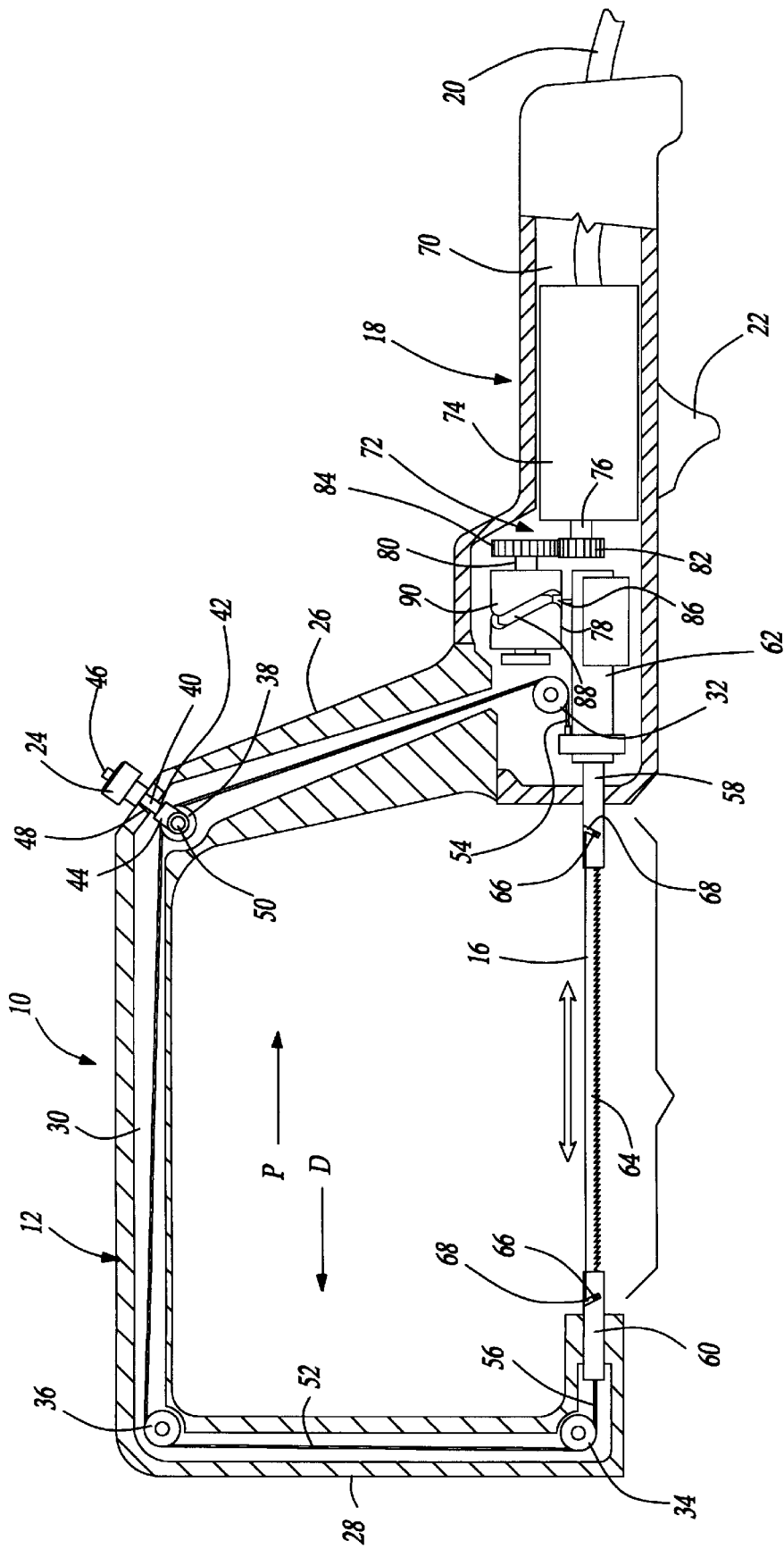
FIG. 2 is a cross-sectional view of the coping saw of FIG. 1 with portions of the U-shaped frame broken away to show internal components and portions of the handle broken away to show a rotary drum cam used to move the saw blade in a reciprocating motion.

FIG. 2 is a cross-sectional view of saw 10 exposing components internal to U-shaped frame 12 and handle 18. U-shaped frame 12 includes two side members 26 and 28 and a frame cavity 30 extending fully about frame 12. For ease of description only, the side frame member 26 adjacent the handle is sometimes referred to herein as the proximate side member, the intermediate frame member 12 may be referred to as the end member and the opposed side frame member 28 may be referred to as the distal side member. Thus, the components or elements of the coping saw of this invention may be referred to by their proximity to or relative distance from the handle or body 18. Positioned within frame cavity 30 are four rotatable pulleys 32, 34, 36, and 38 with one pulley located near each end of side members 26 and 28. Three pulleys 32, 34, and 36 are fixed with respect to U-shaped frame 12. The remaining pulley 38 is a tension pulley and is selectively moveable relative to U-shaped frame 12. Saw 10 further includes a threaded rod 40 having a first end 42 attached to a clevis 44 and second end 46 inserted through an aperture 48 in U-shaped frame 12. Pulley 38 is rotatably supported as clevis 44 is pinned through a center axis 50 of pulley 38. Thumb screw 24 is threaded upon the second end 46 of rod 40. Thumb screw 24 may be turned in either direction to move pulley 38 relative to U-shaped frame 12. As such, thumb screw 24 may be used to tauten or loosen blade 16. Alternatively, one skilled in the art will recognize that other types of tension pulleys, such as a spring loaded tension pulley, may also be used in the present invention.

A flexible band 52 having a first end 54 and a second end 56 is entrained about pulleys 32, 34, 36, and 38 and is routed within frame cavity 30. Preferably, band 52 is a steel cable or other similar material. First end 54 of band 52 is operatively connected to a proximate blade retaining chuck 58 while the second end 56 of band 52 is attached to a distal blade retaining chuck 60. Both first end 54 of band 52 and proximate blade retaining chuck 58 are attached directly to a reciprocating shaft 62. Alternatively, one of ordinary skill in the art will recognize that the both first end 54 of band 52 and reciprocating shaft 62 could be attached directly to proximate blade retaining chuck 58.

Saw 10 further includes saw blade 16 having a cutting edge 64. Saw blade 16 is retained between chucks 58 and 60 with cutting edge 64 directed away from the area enclosed by U-shaped frame 12. Saw blade 16 has a perpendicularly projecting peg 66 near each end of saw blade 16. To retain saw blade 16, each chuck 58 and 60 has an opening 67 in the end opposite band 52 adapted to receive one end of saw blade 16 and a retaining slot 68 adapted to receive one peg 66. FIGS. 3, 4, and 5 are enlarged top, side, and end views respectively of distal blade retaining chuck 60 best showing opening 67 and retaining slot 68. Slot 68 is angled so as to retain peg 66 when saw blade 16 is pulled taut by band 52. Saw blade 16 may be removed from chucks 58 and 60 when band 52 is loosened by way of thumb screw 24. One of ordinary skill in the art will recognize that saw blade 16 may be retained between chucks 58 and 60 with other conventional fastening devices, such as a screw. Thumb screw 24 may be turned in one direction to tauten blade 16 and band 52 should band 52 stretch during use or turned in the opposite direction to loosen blade 16 and band 52 and thereby facilitate the replacement of blade 16.

Referring back to FIG. 2, handle 18 includes a hollowed portion 70 within which a reciprocating drive 72 is supported. Reciprocating drive 72 includes a motor 74 having a rotary output shaft 76, a drum cam 78 having a rotary input shaft 80, and a reciprocating shaft 62. Reduction gears 82 and 84 are fixedly secured to output shaft 76 of motor 74 and input shaft 80 of cam 78 respectively. Reduction gear 82 is intermeshed with reduction gear 84. Reciprocating shaft 62 includes a pin or, more preferably, a cylindrical bearing 86 as shown which is slidably fixed within a continuous groove 88 about cylindrical surface 90 of cam 78. One of ordinary skill in the art will appreciate that bearing 86 may be a conventional ball or pin bearing. Groove 88 spirals from one end of cam 78 to the opposite end of cam 78 in one-half revolution of cam 78. During the next one-half revolution of cam 78, groove 88 spirals from the opposite end of cam 78 back to its originating point thereby forming a continuous channel about the cylindrical surface 90 of cam 78. Thus, the groove, 88 is generally spiraled, spiraling in one direction toward a first end of the drum cam 78 and then spiraling in the opposite direction toward the opposed end of the drum cam, wherein the spiral portions of the groove are interconnected by arcuate or U-shaped portions 92. As shown, the sidewalls of groove 88 are generally perpendicular to cylindrical surface 90 to facilitate the movement of cylindrical bearing 86 in groove 88. The groove 88 in the drum cam 78 which receives the bearing 86 thus smoothly translates rotary to reciprocating motion without binding as the saw blade 16 is driven through a workpiece. As will be understood by those skilled in the art, the shaft 80 of the drum cam 78 may be coupled directly to the drive shaft 76 of the motor, thus eliminating gears 82 and 84 and the drum cam 78 may be utilized to translate rotary to reciprocating motion in other unrelated applications. Multiple bearings, such as bearing 86, may also be inserted into the spiraled slot 88 in other applications to drive multiple reciprocating elements. The cam 78 may be formed of metal, such as stainless steel or friction resistant plastics, such as nylon. In the most preferred embodiment, cam 78 is supported by a thrust bearing.

The revolution of cam 78 is controlled by motor 74. The rotary movement of output shaft 76 of motor 74 is transferred through reduction gears 82 and 84 to input shaft 80 of the rotating drum cam 78 at a reduced speed relative to output shaft 76. As drum cam 78 rotates, bearing 86 slides within groove 88 thereby moving shaft 62 in alternating and repetitive proximal and distal directions. An example of a motor which will function in the present invention is a 2700 RPM rated 7.2 volt DC motor manufactured by Black and Decker although any similar motor may be used.

Figure 6A:
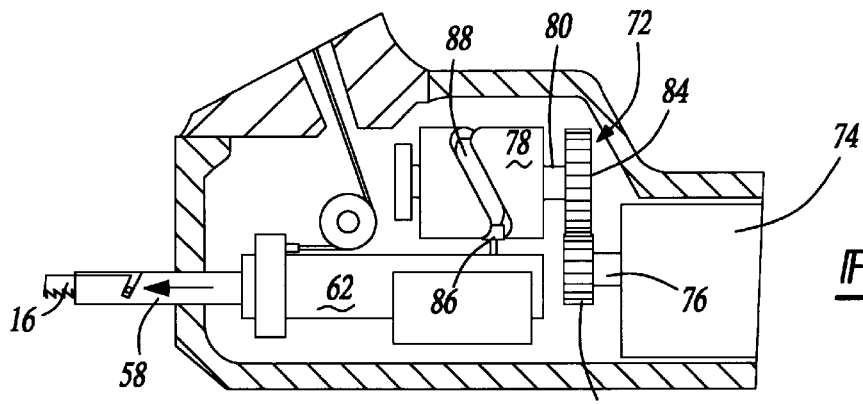
FIG. 6A is a fragmentary, cross-sectional view of handle showing saw blade in a furthermost proximal position.
Figure 6B:
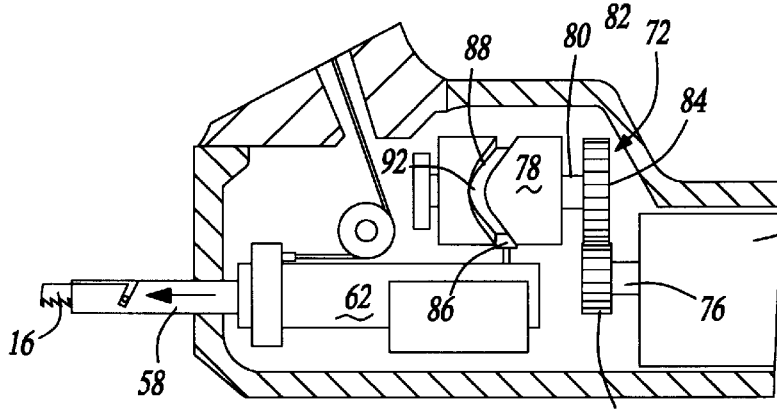
FIG. 6B is a fragmentary, cross-sectional view similar to FIG. 6A showing the drum cam rotated one-quarter revolution.
Figure 6C:
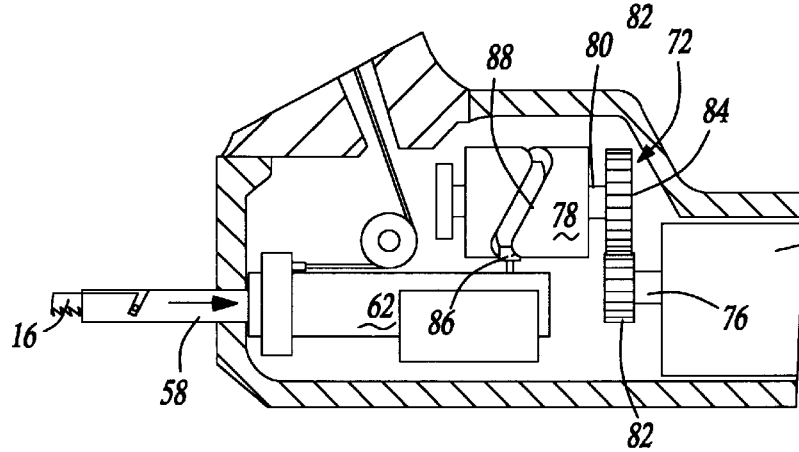
FIG. 6C is a fragmentary, cross-sectional view similar to FIG. 6B showing the drum cam further rotated one-quarter revolution.
Figure 6D:
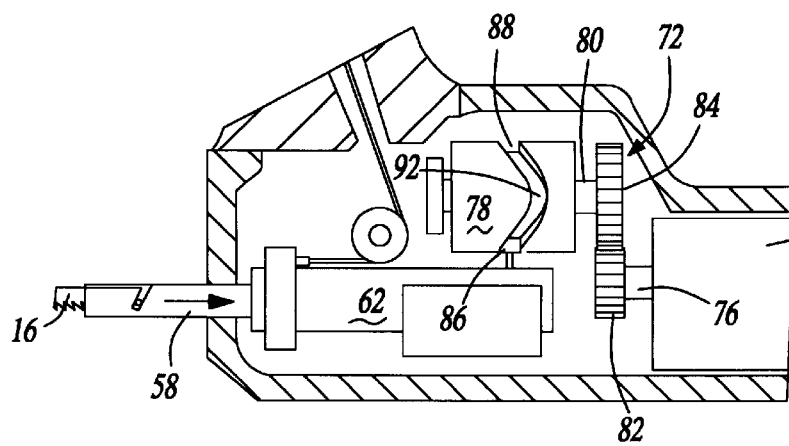
FIG. 6D is fragmentary, cross-sectional view similar to FIG. 6C showing the drum cam further rotated one-quarter revolution.

One full cycle of reciprocating motion will now be shown in one-quarter revolution increments with reference to FIGS. 6A–D. In FIG. 6A is a fragmentary, cross-sectional view of handle 18 showing saw blade 16 in a furthermost proximal position. FIG. 6B is fragmentary, cross-sectional view similar to FIG. 6A showing drum cam 78 rotated one-quarter revolution. Reciprocating shaft 62 has been slid in a distal direction thereby moving saw blade 16 to an intermediate position. FIG. 6C is a fragmentary cross-sectional view similar to FIG. 6B showing drum cam 78 further rotated one-quarter revolution. Reciprocating shaft 62 has been slid further in a distal direction thereby moving saw blade 16 to a furthermost distal position. FIG. 6D is fragmentary, cross-sectional view similar to FIG. 6C showing drum cam 78 further rotated one-quarter revolution. Reciprocating shaft 62 has now been slid in a proximate direction thereby moving saw blade 16 back to the intermediate position. During the final one-quarter revolution of drum cam 78, reciprocating shaft 62 is slid further in a proximate direction thereby moving saw blade 16 back to the furthermost proximate position as shown in FIG. 6A.

Figure 7:
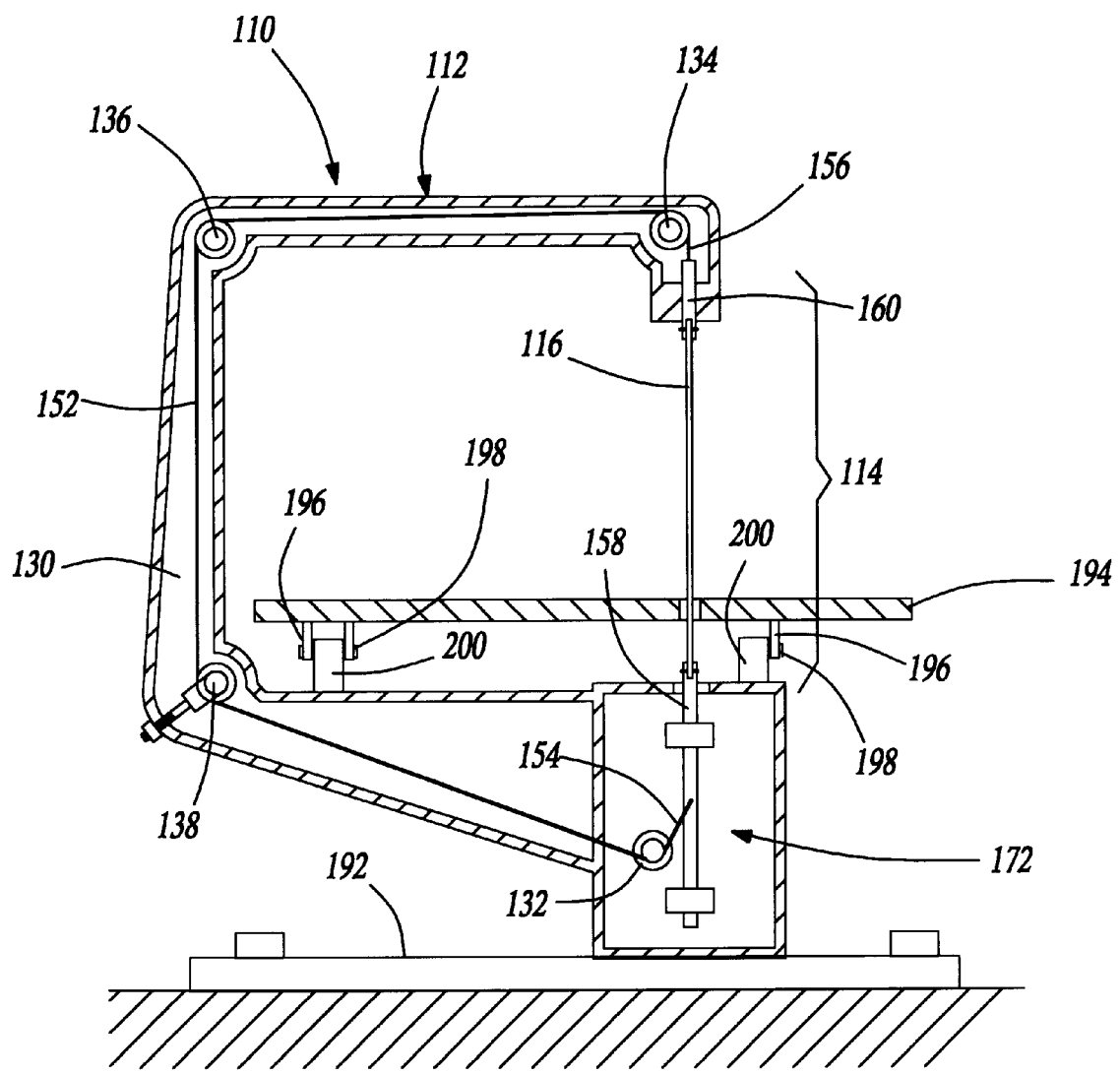
FIG. 7 is a perspective view of an alternative embodiment of the present invention in the form of stationary powered table saw.

FIG. 7 is a perspective view of an alternative embodiment of the present invention in the form of stationary powered table saw 110. Table saw 110 operates in a similar manner as hand-held powered coping saw 10 described above. Like numerals beginning with 100 indicate like or corresponding parts between coping saw 10 and table saw 110. Frame 112 is generally made from a rigid, durable material such as metal or aluminum and must be strong enough to withstand durable material such as metal or aluminum and must be strong enough to withstand the normal stresses imposed on a table saw during use.

Table saw 110 includes a base plate 192 to which frame 112 is attached. Frame 112 is attached to base plate 192 such that blade 116 is oriented in a vertical direction. One of ordinary skill in the art will recognize that base plate 192 may be attached to a supportive structure such as a bench or floor. In FIG. 7, base plate 192 is shown bolted to a floor.

Table saw 110 further includes a table 194 pivotably attached to frame 112 generally perpendicular to blade 116. Table 194 has a bracket 196 which may be pivotably attached with a pivot pin 198 to a boss 200 on frame 112. One of ordinary skill in the art will recognize that table 194 may be pivotably attached to frame 112 with other adjustable fastening arrangements. Table 194 is generally made from a rigid, durable material such as plastic, metal, or aluminum and must be strong enough to support the typical type of work piece cut on a table saw.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A hand held powered coping saw comprising:
    a hollow body including a handle;
    an enclosed U-shaped frame having a passage therethrough including a proximate end connected to said body and a distal end;
    a motor having a rotary drive shaft located within said body;
    a reciprocating drive located within said body including a rotary cylindrical cam having an input shaft operably connected to said rotary drive shaft of said motor, said rotary cylindrical cam having a helical bearing surface and a reciprocally driven member having a bearing engaging said helical bearing surface;
    a coping saw blade bridging said proximate and distal ends of said enclosed U-shaped frame including a proximate end operatively connected to said reciprocally driven member and having a distal end;
    a plurality of pulleys rotatably supported within said passage of said enclosed U-shaped frame; and
    a flexible band having a proximate end operatively connected to said reciprocally driven member, a mid portion entrained around said pulleys in said passage of said enclosed U-shaped frame and a distal end connected to said distal end of said coping saw blade, whereby said proximate end of said coping saw blade is pushed by said reciprocally driven member and said distal end of said coping saw blade is pulled by said flexible band.

2. The hand held powered coping saw defined in claim 1, wherein said helical bearing surface comprises a flat helical groove and said bearing includes a rotatable cylindrical bearing member received in said helical groove rotatably supported on a shaft connected to said reciprocally driven member.

3. The hand held powered coping saw defined in claim 1, wherein said reciprocating drive includes a first reduction gear fixed on said rotary drive shaft of said motor and a second reduction gear fixed on said input shaft of said rotary cylindrical cam.

4. The hand held powered coping saw defined in claim 1, wherein said enclosed U-shaped frame includes a proximate side member connected to said body extending at an angle to said handle, an end member extending at an angle to said proximate side member and a distal side member connected to said end member and said flexible band comprises a flexible cable extending through said passage entrained around said pulleys.

5. The hand held powered coping saw defined in claim 4, wherein a first pulley located adjacent said rotary cylindrical cam, a second and third pulley located adjacent the junctions of said end member and said side members and a fourth pulley located adjacent an end of said distal side member, said flexible cable proximate end connected to said reciprocally driven member and said distal end of said cable operatively connected to said coping saw blade distal end.

6. A hand held powered coping saw comprising:
    a body including a handle;
    an enclosed U-shaped frame having a passage therethrough, a proximate end connected to said body and an opposed distal end;
    a motor having a rotary drive shaft located within said body;
    a reciprocating drive operatively connected to said rotary drive shaft having a reciprocating drive shaft;
    a coping saw blade bridging said proximate and distal ends of said enclosed U-shaped frame having a proximate end operatively connected to said reciprocating drive shaft and having a distal end;
    a plurality of pulleys located within said passage of said enclosed U-shaped frame; and
    a flexible band having a proximate end operatively connected to said reciprocating drive shaft, a midportion entrained around said pulleys in said enclosed U-shaped frame and a distal end connected to said distal end of said coping saw blade, whereby said proximate end of said coping saw blade is pushed by said reciprocating drive shaft and said distal end of said coping saw blade is pulled by said flexible band.

7. The hand held powered coping saw defined in claim 6, wherein said reciprocating drive includes a rotary cylindrical cam operably connected to said rotary drive shaft of said motor, said rotary cylindrical cam having a helical bearing surface, and a reciprocally driven member connected to said proximate end of said coping saw blade having a bearing engaging said helical bearing surface, thereby driving said coping saw blade in a reciprocating motion.

8. The hand held powered coping saw defined in claim 7, wherein said rotary bearing includes a cylindrical bearing member rotatably supported on a shaft connected to said reciprocally driven member.

9. The hand held powered coping saw defined in claim 7, wherein said reciprocating drive includes a first reduction gear fixed to said rotary drive shaft of said motor and a second reduction gear fixed to an input shaft of said rotary cylindrical cam.

10. The hand held powered coping saw defined in claim 6, wherein said enclosed U-shaped frame includes a proximate side member connected to said body extending at an angle to said handle, an end member extending at an angle to said proximate side member and a distal side member connected to said end member and said passage extending through said side members and said end member communicating with an opening in said body, and said flexible band comprising a flexible cable extending through said passage entrained around said pulleys.

11. The hand held powered coping saw defined in claim 10, wherein a first one of said pulleys located adjacent said reciprocating drive, a second one and a third one of said pulleys located adjacent the junctions of said end member and said side members, and a fourth one of said pulleys located adjacent an end of said distal side member.

12. The hand held powered coping saw defined in claim 11, wherein one of said pulleys is rotatably supported by a male threaded member extending through said enclosed U-shaped frame and a nut threadably received on said male threaded member adapted to taughten and loosen said flexible cable.

13. The hand held powered coping saw defined in claim 12, wherein said male threaded member includes a clevis rotatably supporting said pulley.

14. The hand held powered coping saw defined in claim 6, wherein said handle is hollow and extends from one side of said U-shaped frame and said motor is located within said handle.

15. The hand held powered coping saw defined in claim 14, wherein said motor is powered by a battery located within said handle.

16. A powered coping saw comprising:

a motor having a rotary drive shaft;

a reciprocating drive including a rotatory cylindrical cam operatively connected to said rotary drive shaft of said motor and having a helical bearing surface and a reciprocally driven member including a rotatable bearing rotatably engaging said helical bearing surface and a first blade retaining chuck;

a plurality of spaced pulleys;

a flexible cable including a proximate end connected to said reciprocally driven member, a mid portion entrained around said pulleys and a distal end connected to a second blade chuck opposite to and coaxially aligned with said first blade chuck; and a coping saw blade having a proximate end connected to said first blade chuck and a distal end connected to said second blade chuck, whereby said proximate end of said coping saw blade is pushed by said reciprocally driven member and said distal end of said blade is pulled by said flexible cable.

17. The powered coping saw defined in claim 16, wherein said reciprocating drive includes a first reduction gear fixed on said drive shaft of said motor and a second reduction gear is fixed on an input shaft of said rotary cylindrical cam.

18. The powered coping saw defined in claim 16, wherein said coping saw is a hand held powered coping saw having a body including a handle and an enclosed U-shaped frame member having a passage therethrough including a proximate end connected to said body, and wherein said motor and reciprocating drive are located within said body and said pulleys are located within said passage of said U-shaped frame.

* * * * *